April 20, 1948.　　　　C. G. PULLIN　　　　2,440,225
HELICOPTER ROTOR MOUNTING AND DRIVE
Filed May 20, 1944　　　9 Sheets-Sheet 1

Cyril George Pullin
BY
Synnestvedt & Lechner
ATTORNEYS

April 20, 1948.
C. G. PULLIN
2,440,225
HELICOPTER ROTOR MOUNTING AND DRIVE
Filed May 20, 1944
9 Sheets-Sheet 2
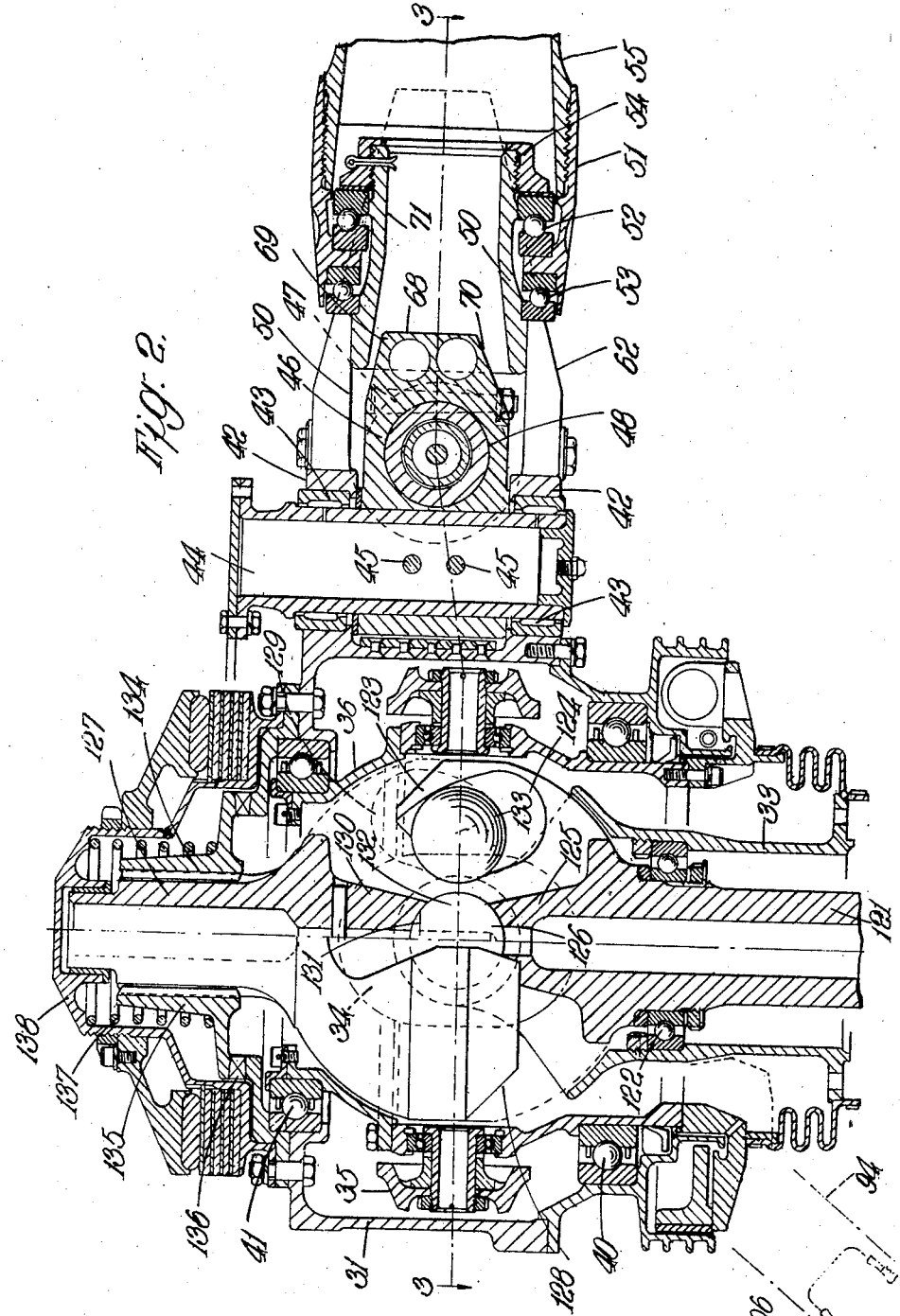

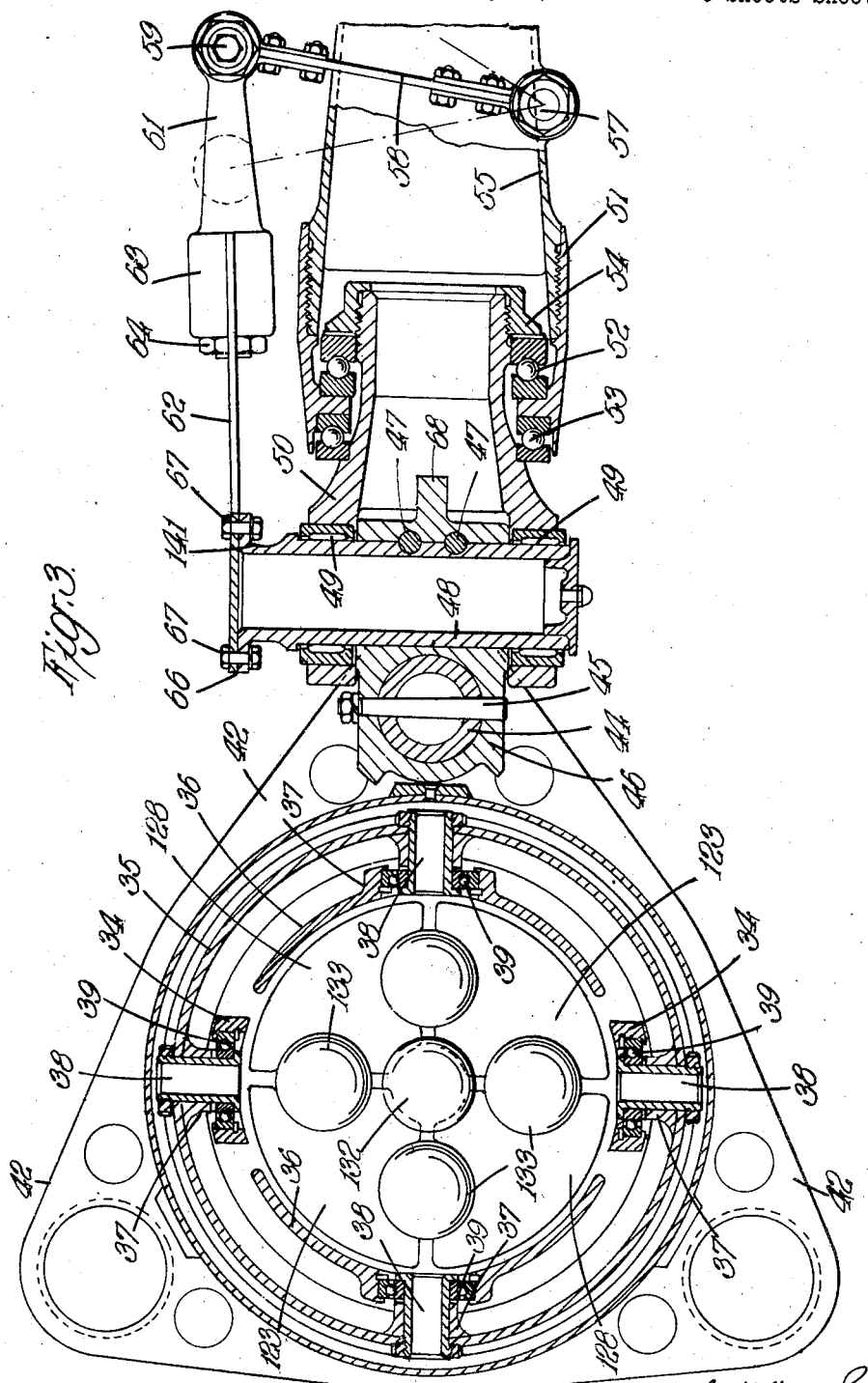

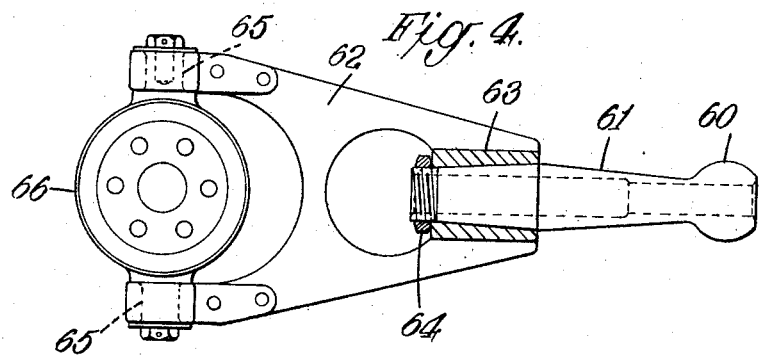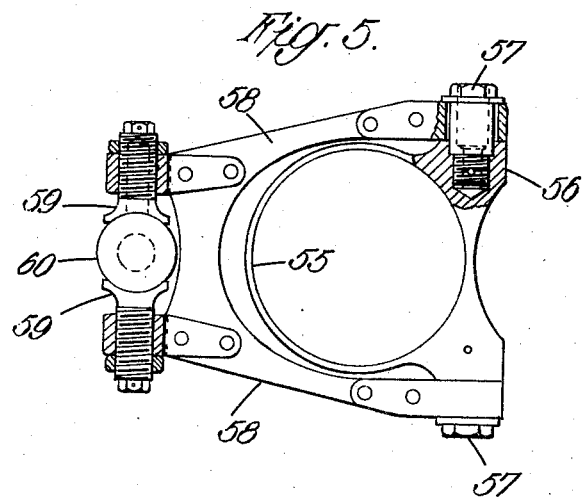

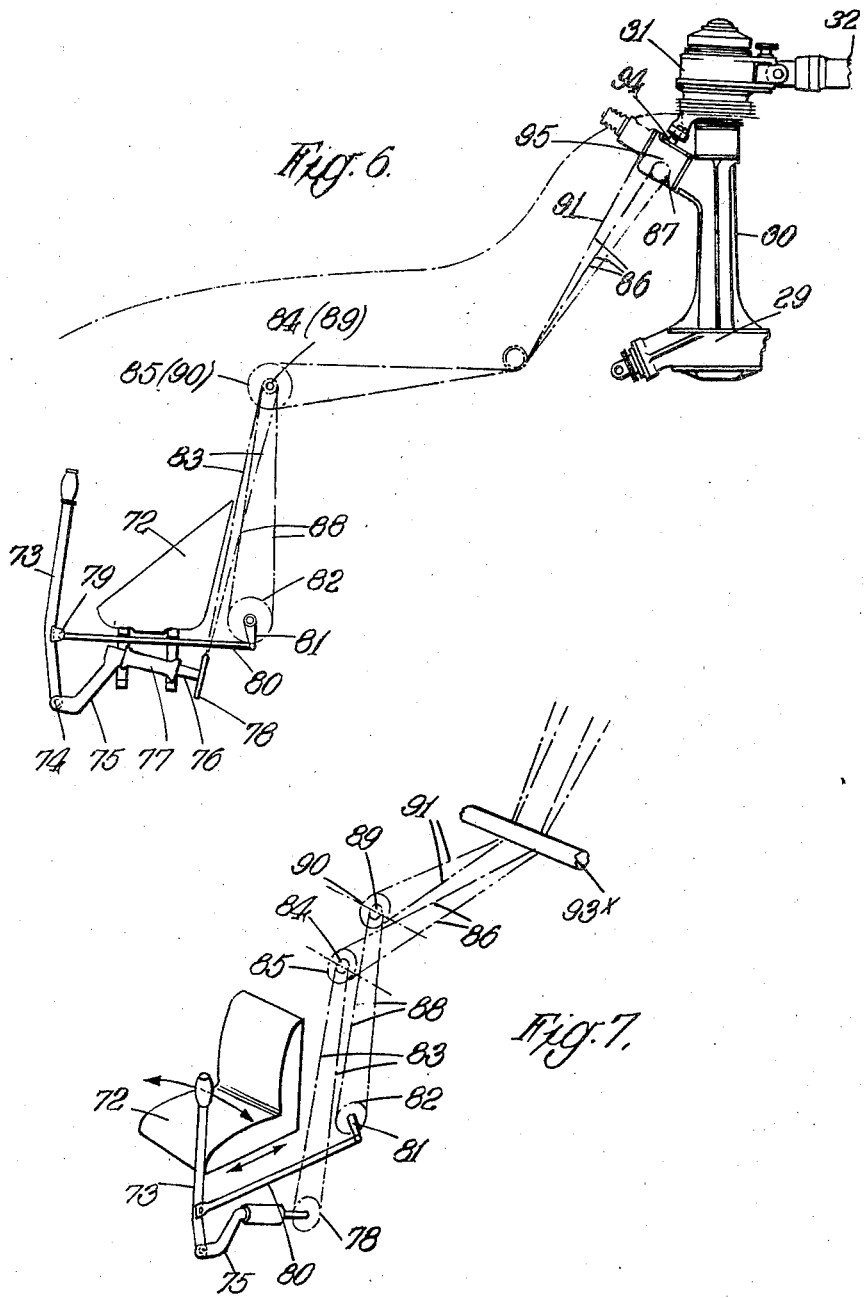

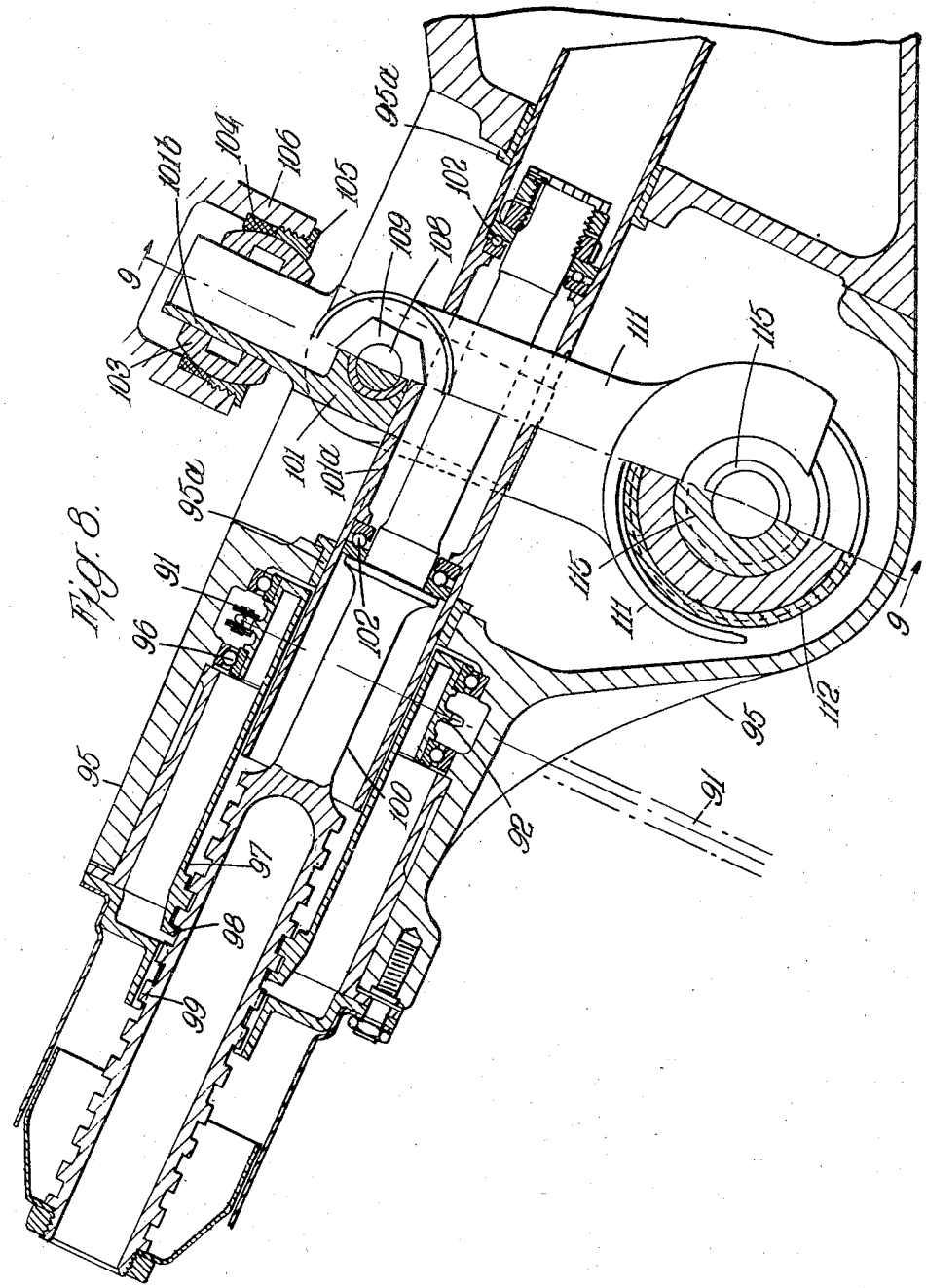

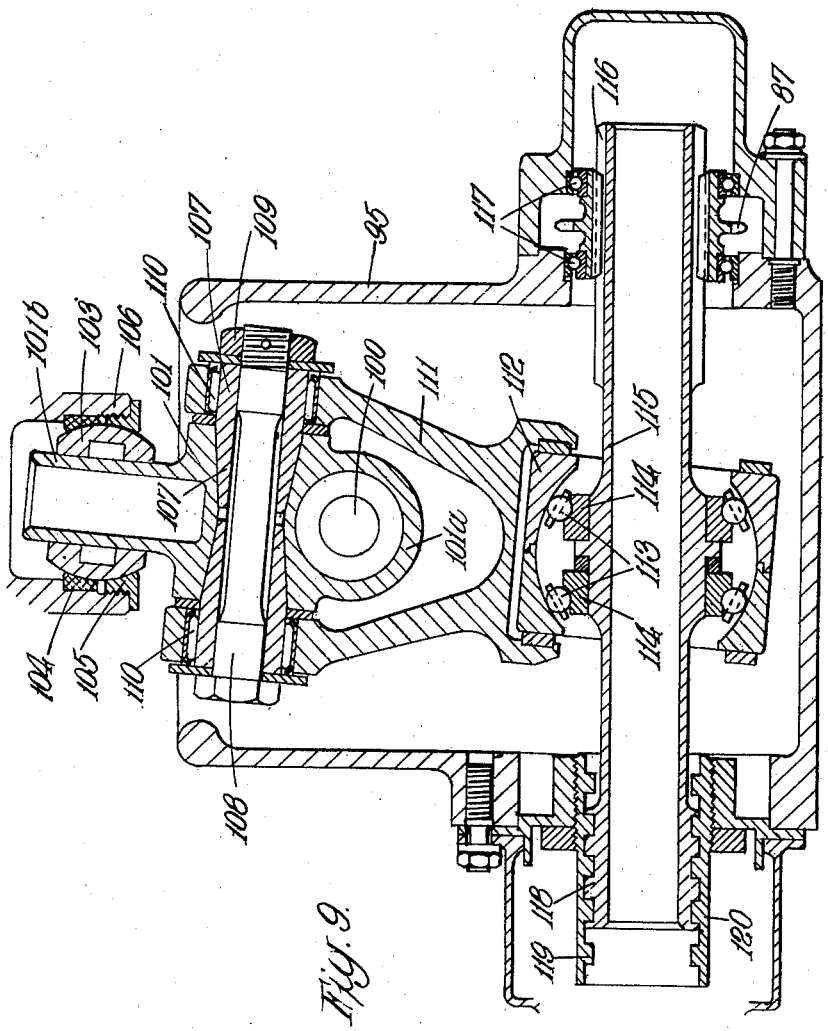

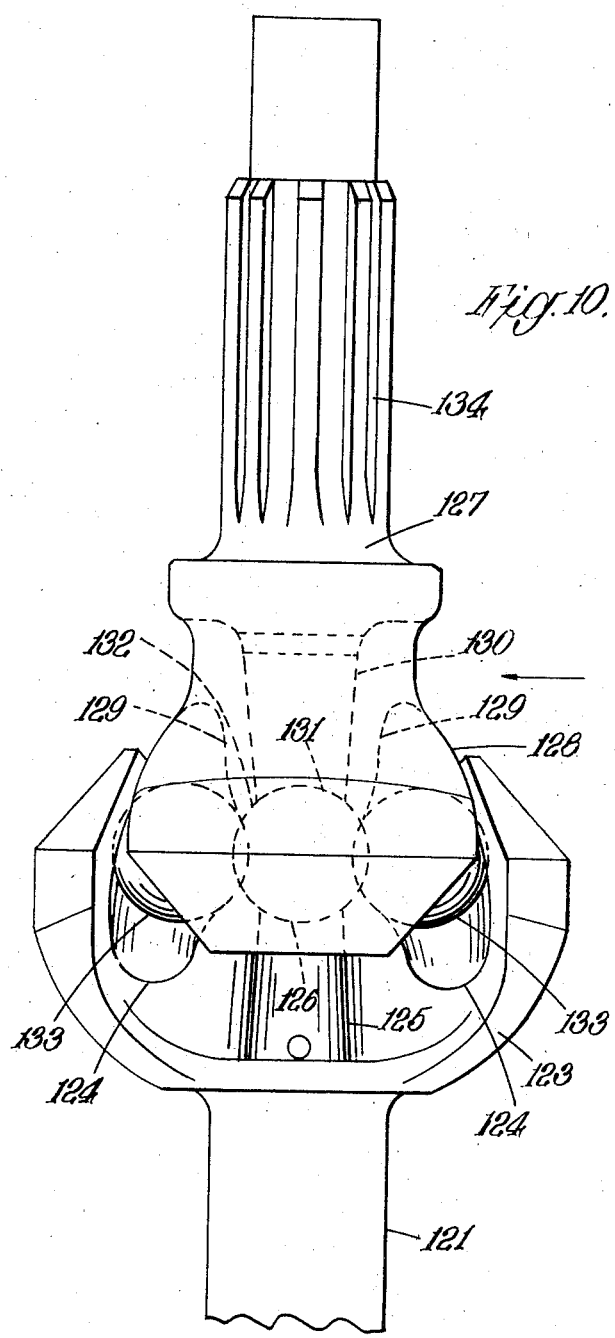

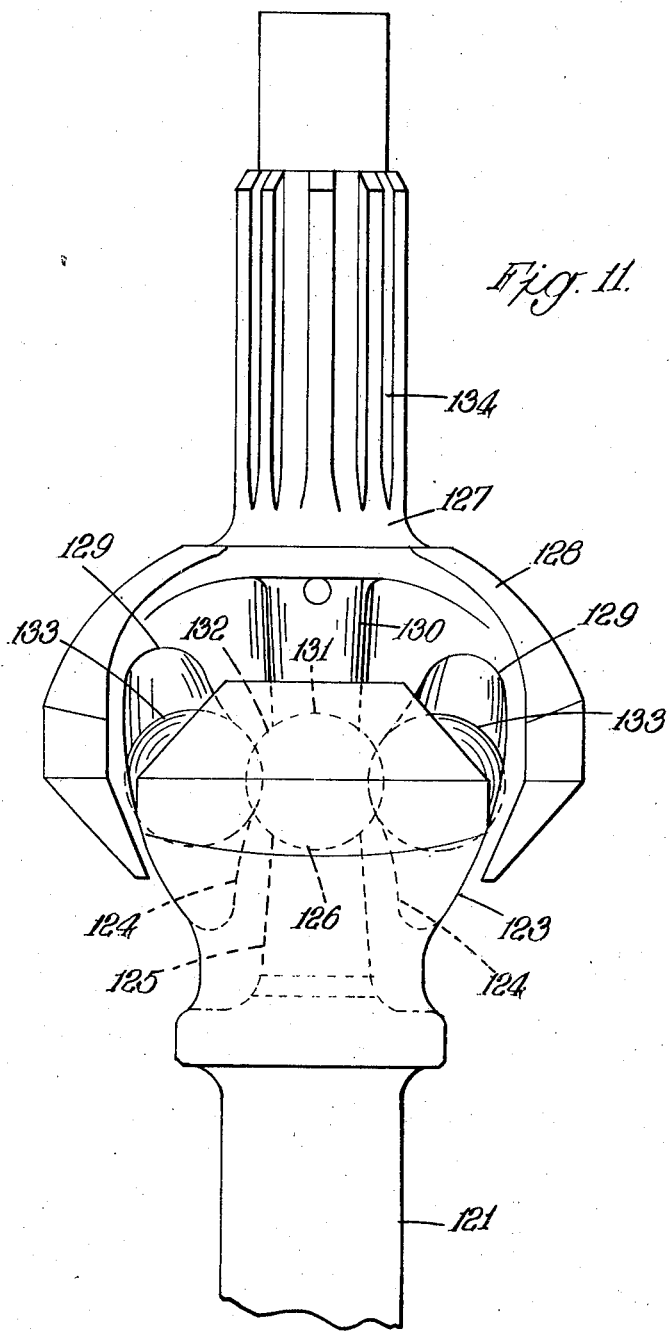

Patented Apr. 20, 1948

2,440,225

UNITED STATES PATENT OFFICE 2,440,225

HELICOPTER ROTOR MOUNTING AND DRIVE

Cyril George Pullin, Wimbledon, London, England

Application May 20, 1944, Serial No. 536,547
In Great Britain May 18, 1943

Section 1, Public Law 690, August 8, 1946
Patent expires May 18, 1963

20 Claims. (Cl. 244—17)

This invention relates to helicopter rotors, rotor mounting and drive, and more particularly to controllable rotor systems, the invention being especially useful in helicopters having a mechanically-driven direct-control sustaining rotor of the tilting-hub type characterized also by torsional flapping, i. e., blade flapping correlated with pitch change (either by an oblique flapping pivot or by a system of pivots and suitable constraints) in such wise that blade pitch angle varies with flapping angle, preferably being uniquely dependent on flapping angle.

In such a torsional flapping rotor considerations of stability require that pitch angle decrease with upward flapping.

In a rotor of this type angular acceleration of the hub gives rise to a complex system of inertia loads which, besides causing undesirable stresses on the blade roots and pivot pins and uneven loading of the pivot bearings, imposes, because of the flapping and pitch variation, unsymmetrical forces on the hub; these are transmitted, via the axle member, to the controls.

Now, with a tilting hub the drive must be applied through some kind of flexible transmission. If an ordinary cardan joint is employed the angular velocity of the driven member varies periodically with respect to that of the driving member, unless the two members are coaxial, the frequency being twice per revolution and the amplitude increasing with the angle between the axes of the two members; if the driving member rotates at constant angular velocity $\omega$, the angular velocity of the driven member fluctuates twice per revolution through the range $\omega \cos \theta$ to $\omega/\cos \theta$ where $\theta$ is the angle between the axes. Such a drive will therefore cause fluctuating stresses on the blades and their pivotal attachments and oscillating loads on the controls, both of frequency twice per revolution, and owing to the high values of the maximum angular acceleration in each oscillation these loads are very heavy.

An object of this invention is to overcome this difficulty with especial reference to the control problem, because the problem of blade and pivot stressing can be met to some extent by increasing factors of safety and by employing drag pivots, allowing "lead" and "lag" of the blades, preferably with dampers, but the effect on the controls makes them difficult to operate and may result in the aircraft becoming practically uncontrollable.

The present invention attains this object by combining with a tiltable, and more particularly with a controllably tiltable, helicopter rotor, a driving transmission employing a "constant velocity" or homokinetic joint whose centre, that is the point of intersection of the driving and driven axes, is substantially or nearly coincident with that of the universal or gimbal mounting of the rotor axle member.

The constant velocity joint or/and its connections may be so arranged that the rotative members of the joint are not subjected to axial or side loading of any substantial amount, the condition of pure torque loading being approached as closely as possible. How this is done depends on the type of constant velocity joint employed. In one known variety, exemplified by the joint known under the trade name "Tracta," the driving and driven members are connected by a compound joint having universal rocking freedom and which possesses some axial freedom, the shafts being located by non-rotary casing members, spherically jointed on one another. Other known types of constant velocity joint are mechanically equivalent, being composed in essence of a pair of shaft locating non-rotary casings universally jointed on one another and a shaft jointing component consisting of a pair of closely coupled cardan joints combined with an axially slidable joint. All such types of joint either possess inherently the axial slidability between the shaft jointing members (e. g. the "Tracta" joint), or include an axially slidable connection. The axial slidability substantially prevents axial loads from being transmitted from the driven to the driving shaft; and the duplication of the cardan joint elements combined with the axial slidability substantially prevents the transmission of side loads as well. Such loads are therefore carried by the casing members. In the application of such a joint to this invention the gimbal or universal mounting of the non-rotative rotor axle member itself preferably constitutes the non-rotative casing part of the constant velocity joint and this part of the assembly carries the thrust and side loads of the rotor, the pivots of the gimbal or like mounting being unaffected by the torque load carried by the components of the constant velocity joint proper.

Other types, however, of constant velocity joint are known, the rotative portions of which are not inherently incapable of transmitting axial load; for instance the type having male and female spherical shaft ends connected by balls located in loxodromic intersecting grooves in the spherical members. If this type of joint is used, or an equivalent thereof, a splined joint, having axial freedom, is introduced between the driven member of the joint and the hub member of the rotor. Alternatively, a fully floating driving shaft embodying a splined joint may be used.

It is an object of this invention to ensure that the loads imposed on the flying controls are, as far as possible, independent of the torque transmitted to the rotor and this object is substantially achieved by the arrangements described.

As the universal suspension of the tiltable axle member has to carry the thrust and side loading of the rotor, a gimbal suspension is preferred to any form of spherical joint, because the pivots of the former, at which the load transmission occurs, can readily be provided with ample bearings of ball or roller type adapted to carry end as well as radial loading, the provision of adequate antifriction bearings with a spherical type of joint being a matter of some difficulty. Any excessive friction in the universal suspension of the axle member will adversely affect the operation of the controls. Further, the gimbal structure is inherently resistant to torque and provides for a simple solution of design problems connected with the provision of a rotor brake, the stationary parts of which must be carried by the tiltable hub member. If a spherical joint were used an additional constraint of robust construction would have to be incorporated to prevent relative rotation of the joint members about the axis of rotation of the rotor under the braking torque; and the detail design of such constraint would present problems of some difficulty.

How the foregoing objects are attained, and others which will hereinafter appear, will be understood from the following description with reference to the accompanying drawings of a preferred embodiment of the invention, the scope of which is defined in the appended claims.

In the drawings:

Figure 2 is a view in longitudinal vertical section of the rotor hub and attachments of one rotor blade;

Figure 3 is a view in section taken along the line 3—3 of Figure 2;

Figures 4 and 5 are detail views in elevation of parts shown in Figure 3;

Figure 6 is a somewhat diagrammatic view in side elevation of the pilot's control connections;

Figure 7 is a diagrammatic view of the same in perspective;

Figure 8 is a view in longitudinal vertical section of the "control housing" (shown at 95 in Figure 6);

Figure 9 is a view in section taken along the line 9—9 of Figure 8; and

Figures 10 and 11 are two views in elevation, taken at right angles to one another, of the parts comprising the constant velocity joint of the rotor drive.

Figure 1:
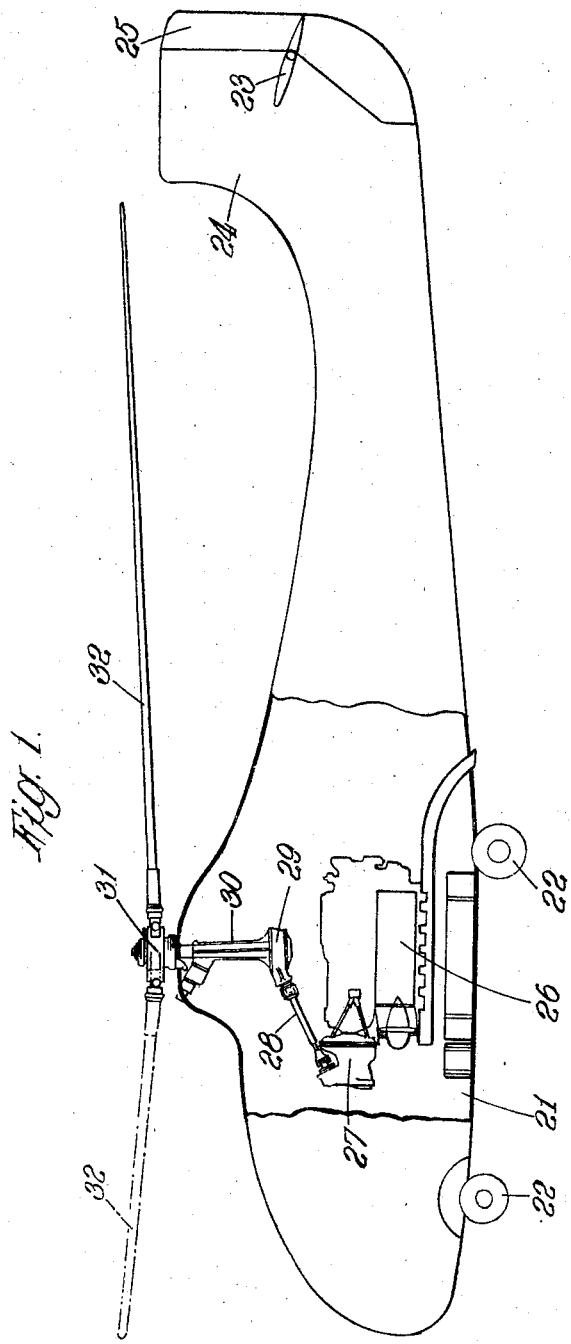
Figure 1 is a somewhat diagrammatic view in side elevation, partly in section, of a helicopter embodying the invention.

Referring to Figure 1, the helicopter includes a body 21, undercarriage elements 22, elevator 23, vertical fin 24 and rudder 25. Within the body is mounted the engine 26, which drives the rotor through gears contained in gear boxes 27, 29 and a transmission shaft 28. The final drive shaft is contained in a casing 30 forming an extension of the gear box 29.

The rotor hub is shown at 31 and the lifting rotor blades at 32.

Referring now to Figures 2, 3, 4 and 5, the casing 30 of Figure 1 is extended upwardly by a hollow support member 33 terminating in a forked end 34 which supports a gimbal ring 35; this in turn supports a hollow axle member 36. The gimbal ring 35 is provided with four equally spaced inwardly projecting bosses 37 carrying trunnions 38 provided with ball bearings 39. One pair of trunnions articulates with the ends of the supporting fork 34 and the other pair of trunnions with the axle member 36, on which the hub 31 is rotatably mounted by means of ball bearings 40, 41.

The rotor in this example has three blades, to support which the hub is provided with three pairs of ears 42 housing needle bearings 43, in which drag pivot pins 44 are rotatable. Drag links 46 are secured by taper pins 45 to the pins 44. Lead/lag displacements of the rotor blades are accommodated by movement of the drag links and pivot pins relatively to the hub ears 42.

Secured by taper pins 47 in the drag link 46 is a flapping pivot pin 48 and rotatably mounted thereon by means of needle bearings 49 is a blade root supporting link 50 on which the blade is rotatably mounted for torsional, i. e., pitch varying, displacement by means of a ball thrust bearing 52, a preload bearing 53 and a preload nut 54. The main spar of the blade (32) is shown at 55 and is screwed into a blade root housing 51 which is supported on the bearings 52, 53.

In order to obtain the stable torsional/flapping characteristic, the torsional and flapping displacements of the blade are made interdependent by means of a linkage comprising a lever 58 secured to the blade and an arm 61, 62 lying approximately parallel to the blade and on the leading side thereof, and secured to the flapping pivot pin. This construction is shown in Figures 3, 4 and 5.

A pair of lugs 56 integral with the spar 55 carries pivot studs 57 on which the lever 58, which is forked, articulates. The forward end of this lever carries studs 59 with spherical seatings which engage a ball 60 formed on the end of the arm part 61; the other end of the latter is tapered to fit in a taper socket of a boss 63 formed on the arm part 62, being secured by a nut 64. The inboard end of the arm part 62 is forked and the fork end engages trunnions 65 formed on a collar 66, which is secured by bolts 67 to a flange integral with the flapping pivot pin 48.

Since the pin 48 is locked to the drag link, the arm 61, 62 is prevented from flapping with the blade, with the result that when the blade flaps upwards the linkage 58, 61, 62 causes the blade spar 55 to rotate about the blade-supporting link 50 (on the bearings 52, 53) in the direction for decreasing the pitch angle of the blade. Conversely, downward flapping is accompanied by increase of pitch angle.

Limitation of upward and downward flapping is provided by means of a stop plate 68, formed integrally with the drag link 46 and having upper and lower faces 69, 70 which engage the inner surface 71 of the blade-supporting link 50.

Referring now to Figures 6 to 9, showing the control mechanism of the tilting hub, the pilot's seat is indicated at 72. In the conventional position is a control column 73 pivoted at 74 to a crank 75 integral with a rocking shaft 76 supported in a bearing 77 and carrying a sprocket 78. The control column is also pivoted at 79 to a push-pull rod 80 actuating a crank 81 carrying a sprocket 82.

A chain or cable 83 is passed over the sprocket 78 and over another sprocket 84 which is fast on a further sprocket 85.

Similarly a chain or cable 88 connects the sprocket 82 with a sprocket 89 fast on yet another sprocket 90. Sprockets 84, 85, 89, 90 are coaxial as shown in Figure 6, but for convenience in following the run of the controls the pairs of sprockets 84, 85 and 89, 90 respectively are shown in Figures 7 with their axes separated.

Sprocket 85 carries a chain or cable 86 which is also passed over a sprocket 87 within a control housing 95, while another sprocket 92 within this housing (see Figure 8) is actuated by a chain or cable 91 which is passed over sprocket 90.

The chains or cables 86, 91 are also passed over four jockey pulleys 93, (indicated diagrammatically in Figure 7 by a bar 93x).

Referring now to Figures 8 and 9, the control housing 95 is secured to the upper end of the casing 30 enclosing the final rotor drive shaft (see also Figure 6). The sprocket 92 is mounted in this housing on bearings 96 and is integral with a sleeve 97 having a quick pitch female thread 98 formed therein. This thread engages a corresponding male thread 99 formed on a bar 100 on which a sleeve portion 101a integral with a link member 101 is rotatably but not slidably mounted by means of bearings 102. The sleeve portion 101a is slidably mounted in the housing 95 by means of bushes 95a.

The link member also carries a divided pivot pin 107, secured by means of a through-bolt 108 and nut 109, and having rotatably mounted thereon, by means of bearings 110, a forked link 111 whose other end carries a spherical race 112 enclosing two cages of balls 113 running on races 114 carried by a cross-shaft 115 which is free to slide endways and to rotate. One end of shaft 115 has splines 116 engaging corresponding splines of the sprocket 87, which is rotatably mounted in the housing 95 by means of bearings 117. The other end of shaft 115 has a male quick pitch thread 118 engaging a corresponding female thread 119 in a sleeve 120 secured in the casing 95.

The link member 101 also has formed thereon a spigot 101b carrying a male spherical element 103 engaging spherical seatings formed in a collar 104 and a nut 105 secured to the socket end 106 of a lever 94 which is integral with the rotor axle member 36 (see Figures 2 and 6). (It will be remembered that the axle member 36 is supported on the gimbal mounting 34, 35 and has the hub 31 rotatably mounted on it).

Fore and aft movement of the control column causes the sprocket 92 to rotate by means of the operation of the intermediate elements 80, 81, 82, 88, 89, 90, 91, and the thread elements 98, 99 cause the bar 100 to move axially carrying with it the link member 101, 101a, 101b, which thereby actuates the lever 94, 106 to tilt the axle member 36 and with it the hub 31 in the fore and aft plane.

Similarly, transverse movement of the control column acting through the intermediate elements 75, 76, 78, 83, 84, 85, 86 rotates the sprocket 87 and shaft 115, which is caused by the thread elements 118, 119 also to slide endways and this moves the forked link 111 to rock the link member 101, 101a, 101b transversely on its bearings 102 and this in turn actuates the lever 94, 106 to tilt the axle member 36 and with it the hub 31 in the transverse plane.

The rotor hub 31 is driven by means of a "constant velocity" or homokinetic joint of the "loxodromic" type illustrated in Figures 2, 3, 10 and 11.

The final drive shaft is shown at 121 and is supported in the supporting member 33 by means of a bearing 122. Its upper end has a pair of integrally formed jaws 123 and an integral central spigot 125. The interior faces of the jaws have formed therein loxodromic grooves 124.

The driven member of the joint consists of a shaft 127 having integrally formed therewith a pair of jaws 128, having internal loxodromic grooves 129, and a central spigot 130, the whole corresponding to the driving member of the joint.

The joint is centralised by means of a central ball 132 engaging spherical seatings 126, 131 formed in the ends of the spigots 125, 130 and the drive is transmitted by four balls 133 engaged in the loxodromic grooves of the jaws 123, 128, each ball engaging one groove of a driving jaw and one groove of a driven jaw. Each of the four jaws (two driving and two driven) thus has two grooves, inclined at equal and opposite angles to the transverse circumferential line of the joint.

The driven shaft 127 is provided with splines 134 engaging corresponding splines in a driving plate 135 which drives the hub 31 through a free-wheel coupling 136 loaded by a spring 137 retained by a cap nut 138.

The splined joint 134 prevents any axial loads from being transmitted by the constant velocity joint, which is concentric with the gimbal mounting of the axle member 36. All side loads imparted to the hub or the axle member by control reactions or forces acting on the rotor blades are transmitted by the gimbal mounting to the supporting member 33, 34 and the constant velocity joint is therefore subjected solely to the driving torque.

The rotor blade mounting, blade pitch regulating mechanism, and other features are claimed in my copending application 536,548, filed May 20, 1944.

What I claim is:

1. In a helicopter, an airframe, a sustaining rotor having blades independently pivoted to a hub for flapping in planes containing the blade axis and the rotational axis and in such a way that the blade pitch angle varies with and is uniquely dependent on the flapping angle, the pitch angle decreasing with upward flapping, said hub including a non-rotative hollow axle member, universal joint means connecting said axle member to the airframe, a pilot's control, means connecting said pilot's control and the axle member for controlling the magnitude and direction of the inclination of the latter from its neutral position, a prime mover and transmission means connecting the latter to the rotor for driving the same and including a homokinetic joint within, and whose centre is substantially coincident with that of the universal mounting of, the rotor axle member.

2. In a helicopter, an airframe, a sustaining rotor having blades independently pivoted to a hub for flapping in planes containing the blade axis and the rotational axis and in such a way that the blade pitch angle varies with and is uniquely dependent on the flapping angle, the pitch angle decreasing with upward flapping, said hub including a non-rotative axle member, universal joint means connecting said axle member to the airframe, a pilot's control, means connecting said pilot's control and the axle member for controlling the magnitude and direction of the inclination of the latter from its neutral position, a prime mover and transmission means connecting the latter to the rotor for driving the same and including a homokinetic joint, said transmission means also including an axially slidable joint located between the driven member of the homokinetic joint and the rotor hub.

3. In a controllable aircraft rotor system comprising blade means adapted to be rotated about an axis, means effective upon the blade means for controllably altering their plane of rotation for shifting their thrust line, a non-rotative support about which the blade means rotate, and power transmitting means for driving said blade means including a homokinetic angling joint centered within said support and accommodating said alteration of plane of rotation.

4. A construction according to claim 3 wherein said homokinetic joint is of the loxodromic type.

5. The construction of claim 3 wherein said rotor has a hub rotatable on said non-rotatable support, and said joint is thus housed within said support and hub.

6. A construction according to claim 3 wherein pivotal mounting mechanism is provided for the blade means, said mechanism providing a virtual point or axis of pivotation centered at the center of said joint.

7. A construction according to claim 6 wherein there is a hub which is mounted to move on said virtual point or axis of pivotation, and wherein said pivot mechanism, in addition to said virtual point or axis of pivotation, provides also one or more axes of pivotation of the blade means with reference to the hub.

8. A construction according to claim 7 wherein a plurality of rotor blades comprise the blade means referred to and wherein each of said blades is independently pivoted on the hub for movement at least in the pitch varying sense.

9. In an aircraft sustaining rotor system comprising blade means adapted to be rotated about a generally upright axis, mechanism providing for universal motion of the blade means with reference to a point on the generally upright axis, means effective upon the blade means for controllably altering the plane of rotation of said blade means for shifting their thrust line, a non-rotative support about which the blade means rotate, and power transmitting means for driving said blade means including a homokinetic angling joint centered within said support and accommodating said alteration of plane of rotation.

10. The construction of claim 9 wherein the center of said joint is adjacent the center of universal motion of the blade means.

11. The construction of claim 10 wherein there is a rotative rotor hub mounted on said non-rotative support and wherein the mechanism providing for universal motion of the blade means comprises a universal mounting for said non-rotative support.

12. An aircraft sustaining rotor comprising blade means adapted to be rotated about an approximately upright axis, a rotatable member carrying said blade means, a mounting provided for tilting of said member and adapted to take rotor lift thrust, and power transmitting means adapted to drive said blade means including a homokinetic joint disposed concentrically within said mounting.

13. In aircraft sustaining rotor construction, comprising blade means adapted to be rotated about an approximately upright axis, rotor transmission mechanism including a centrally disposed torque-transmitting homokinetic joint, substantially free of the rotor lift thrust, and a rotor tilting mounting, through which the rotor lift thrust is carried, disposed circumferentially of said joint and providing for tilting the plane of rotor rotation with reference to the center of said joint.

14. A construction according to claim 13 wherein said mounting includes a gimbal ring assembly disposed peripherally of the central transverse plane of said joint, a non-rotative axle member universally tiltable on said gimbal ring assembly, and a rotor hub carrying the blade means and having bearings between it and said axle member.

15. A construction according to claim 14 wherein the blade means comprise a plurality of blades having individual pitch pivot mountings on said hub.

16. A construction according to claim 14 wherein the blade means comprise a plurality of blades having individual universal mountings on said hub.

17. In aircraft sustaining rotor construction, comprising blade means adapted to be rotated about an approximately upright axis, rotor transmission mechanism including a centrally disposed torque-transmitting homokinetic joint, substantially free of the rotor lift thrust, an overrunning drive connection in series with said homokinetic joint, and a rotor tilting mounting, through which the rotor lift thrust is carried, disposed circumferentially of said joint and providing for tilting the plane of rotor rotation with reference to the center of said joint.

18. The construction of claim 17 wherein said overrunning drive connection is operatively interposed between said homokinetic joint and the rotor blade means, whereby the rotor blade means may overrun the power transmission through said joint.

19. A construction according to claim 18, wherein the overrunning drive connection includes a spring-pressed member having an axially slidable drive connection with a member of said joint whereby said joint is relieved of axial load whether or not the rotor is overrunning the drive.

20. A construction according to claim 3, wherein the rotor comprises a hub and a plurality of blades which are pivoted to the hub for swinging in a direction generally transverse the plane of rotation of the rotor and wherein the blade pitch is altered with such swinging.

CYRIL GEORGE PULLIN.

REFERENCES CITED

The following references are of record in the file of this patent:

UNITED STATES PATENTS

| Number | Name | Date |
|---|---|---|
| 2,163,893 | Schairer | June 27, 1939 |
| 2,263,568 | Campbell | Nov. 25, 1941 |
| 2,352,404 | Pitcairn | June 27, 1944 |
| 2,356,692 | Platt | Aug. 22, 1944 |